United States Patent [19]

Murphy et al.

[11] Patent Number: 5,695,821
[45] Date of Patent: Dec. 9, 1997

[54] METHOD FOR MAKING A COATED NI BASE SUPERALLOY ARTICLE OF IMPROVED MICROSTRUCTURAL STABILITY

[75] Inventors: Wendy H. Murphy, Cincinnati; William S. Walston, Maineville, both of Ohio

[73] Assignee: General Electric Company, Cincinnati, Ohio

[21] Appl. No.: 528,273

[22] Filed: Sep. 14, 1995

[51] Int. Cl.[6] .................................................. B05D 3/00
[52] U.S. Cl. .......................... 427/327; 427/328; 427/355; 427/383.1
[58] Field of Search .............................. 427/327, 328, 427/355, 383.1

[56] References Cited

U.S. PATENT DOCUMENTS

| | | | |
|---|---|---|---|
| 3,802,938 | 4/1974 | Collins et al. | 148/126 |
| 3,960,647 | 6/1976 | Faure et al. | 156/603 |
| 4,116,723 | 9/1978 | Gell et al. | 148/3 |
| 4,222,794 | 9/1980 | Schweizer et al. | 148/3 |
| 4,318,753 | 3/1982 | Anderson, Jr. et al. | 148/3 |
| 4,401,480 | 8/1983 | Crombie, III | 148/11.5 N |
| 4,643,782 | 2/1987 | Harris et al. | 148/404 |
| 4,677,035 | 6/1987 | Fiedler et al. | 428/680 |
| 4,717,432 | 1/1988 | Ault | 148/162 |
| 4,721,540 | 1/1988 | Harris et al. | 148/404 |
| 4,729,799 | 3/1988 | Henricks et al. | 148/13 |
| 4,935,072 | 6/1990 | Nguyen-Dinh | 148/162 |
| 5,100,484 | 3/1992 | Wukusick et al. | 148/20.3 |
| 5,151,249 | 9/1992 | Austin et al. | 420/445 |
| 5,154,884 | 10/1992 | Wukusick et al. | 420/448 |
| 5,173,255 | 12/1992 | Ross et al. | 420/445 |
| 5,270,123 | 12/1993 | Walston et al. | 428/652 |
| 5,366,695 | 11/1994 | Erickson | 420/448 |
| 5,455,120 | 10/1995 | Walston et al. | 428/652 |
| 5,482,789 | 1/1996 | O'Hara et al. | 428/652 |
| 5,516,380 | 5/1996 | Darolia et al. | 148/404 |
| 5,523,170 | 6/1996 | Budinger et al. | 428/551 |
| 5,538,796 | 7/1996 | Schaeffer et al. | 428/469 |
| 5,562,999 | 10/1996 | Grunke et al. | 428/651 |
| 5,598,968 | 2/1997 | Schaffer et al. | 228/262.31 |

FOREIGN PATENT DOCUMENTS

| | | | |
|---|---|---|---|
| 0 545 661 A2 | 6/1993 | European Pat. Off. | C23C 12/02 |
| 0 567 755 A1 | 11/1993 | European Pat. Off. | C23C 10/52 |
| 0 654 542 A1 | 5/1995 | European Pat. Off. | C32C 10/00 |
| 42 22 211 C1 | 7/1993 | Germany . | |

*Primary Examiner*—Benjamin Utech
*Attorney, Agent, or Firm*—Andrew C. Hess; David L. Narciso

[57] ABSTRACT

A coated Ni base superalloy article is provided with improved microstructural stability under a coating at least partially diffused into an article surface portion, by avoiding the formation, after exposure to elevated temperatures, of a constituent called SRZ which can affect detrimentally mechanical properties of the article. Such avoidance can result from neutralizing stress in the article surface portion prior to coating, for example by physically removing the stressed portion or by recrystallizing the stressed portion to a fine grained structure which subsequently can be consumed by diffusing elements in a coating method. Also, such avoidance can result from maintaining a Re segregation factor, ReΔ, between dendrite cores and interdendritic regions of the alloy cast structure at no greater than about 40%.

7 Claims, 2 Drawing Sheets

METHOD FOR MAKING A COATED NI BASE SUPERALLOY ARTICLE OF IMPROVED MICROSTRUCTURAL STABILITY

FIELD OF THE INVENTION

This invention relates to a method for making a Ni base superalloy article, especially to such an article in the form of a single crystal, and, more particularly in one form to such an article including an environmental coating.

BACKGROUND OF THE INVENTION

The development of Ni base superalloys, particularly those intended to form single crystal articles for use at elevated temperatures such as 1800° F. and above, has identified certain phases or conditions which can form in the alloy structure and which can be detrimental to the useful life of the article. One such detrimental condition has been referred to as a Secondary Reaction Zone (SRZ). This formation consists essentially of an orthorombic "P" phase which is a Type II topographically close-packed (TCP) phase, and a gamma phase, both dispersed in a gamma prime matrix. The TCP phase and the gamma phase form needle-like structures within the blocky gamma prime matrix.

Problems associated with the formation of SRZ after exposure of an alloy at temperatures of at least about 1800° F. have been discussed in U.S. Pat. No. 5,270,123—Walston et al, patented on Dec. 14, 1993; and the formation of the TCP phase has been identified in U.S. Pat. No. 5,151,249—Austin et al, patented on Sep. 29, 1992. Also, the TCP phase is addressed in U.S. Pat. No. 5,173,255—Ross et al, patented Dec. 22, 1992, relating to an alloy including about 1.5–4 wt. % Re. The disclosures of each of these patents, assigned to the assignee of this invention, hereby are incorporated herein by reference.

The above incorporated Walston et al patent discloses that the potential for the formation of SRZ within the cast structure of a Ni base superalloy can be predicted and controlled by alloy content, particularly the element Re at greater than about the 4 wt. % shown in the above incorporated Ross et al patent, in the presence of other alloying elements. In solidification of Ni base superalloy single crystal castings, elements segregate either to the dendrites or interdendritic regions. Re segregates heavily to the dendrites and thus internal SRZ typically is observed in dendrites of such alloys including Re.

Some Ni base superalloys, such as those which are identified in the Walston et al patent, have been developed to avoid and rarely do form internal SRZ. However, under certain conditions a small mount of SRZ has been observed in an article surface portion adjacent or under an environmental coating, such as an aluminide or a Pt-Al diffusion coating or an overlay coating at least partially diffused into a surface potion; for example, the well known MCrAlY type of coatings in which "M" generally is Ni, Co, or their combination. Such a condition can have a detrimental effect on mechanical properties of an article including SRZ in such surface portion.

SUMMARY OF THE INVENTION

The present invention, in one form, provides a method for making a coated article of improved microstructural stability from a Ni base superalloy to avoid, after elevated temperature exposure, detrimental formation of SRZ in alloy microstructure in an article surface portion beneath a coating at least partially diffused into the article surface portion by a selected coating method. One form of the method includes the steps of neutralizing, such as by removing, stresses from the surface portion prior to coating by the coating method, and then coating the surface portion with a coating which will at least partially diffuse into the surface portion.

The neutralizing of the stresses can be accomplished by application of surface material removal methods such as electropolishing, electrochemical material removal, or other well known material removal methods practiced in the metallurgical art and which result in a substantially stress free surface portion. Then the coating is applied.

In another form of the present invention, neutralizing of stresses, particularly in a single crystal structure, can be accomplished by recrystallization of the surface portion including the stresses to a free grained cellular structure (sometimes referred to as Type II recrystallization) which extends into the surface portion substantially no farther than a diffusion depth to which the coating is intended to diffuse. In the practice of the present invention, such recrystallization is accomplished by exposing the surface portion to temperatures ranging from about 50° F. below to about 400° F. below the gamma prime solvus temperature for a recrystallization time sufficient to recrystallize the surface portion. Thereafter, coating of the surface portion is conducted in a manner which substantially consumes the fine recrystallized cells within the diffusion coating depth of the article surface portion.

Another form of the present invention provides a method for making an article of improved microstructural stability, to avoid detrimental formation of SRZ in the alloy microstructure under or adjacent to a coating, after elevated temperature exposure, from a cast Ni base superalloy having a cast structure including dendrite cores and interdendritic regions and including Re at greater than about 4 wt. %. The method includes the steps of heating the superalloy above the alloy gamma prime solvus temperature for a time sufficiently long to result in a Re segregation (ReΔ) no greater than about 40%, the ReΔ fraction being defined, before conversion to percent, as:

ReΔ=Re level in dendrite core−Re level in interdendritic/Re level in dendrite core An article made by such a method is characterized as having an ReΔ of no greater than about 40%.

DESCRIPTION OF THE PREFERRED EMBODIMENTS

The prevention of internal SRZ (away from a coating) can be accomplished through bulk alloy chemistry changes or control, or in reduction in elemental segregation. This is shown, in one form, in the above incorporated Walston et al U.S. Pat. No. 5,270,123. However, particularly in respect to diffusion type coatings at a surface portion of a Ni base superalloy article, especially one in the form of a single crystal and including greater than about 4 wt. % Re, it has been recognized that a stress condition in such surface portion can be a major cause of, or driving force toward, the formation of SRZ adjacent to or under such a coating. Such a surface portion stress condition can occur during manufacture of an article, such as a turbine blade for a gas turbine engine, as a result of processing such as cutting, grinding, polishing, abrading, aggressive grit blasting, etc., prior to coating, to obtain desired surface finishes or conditions.

Figure 1:
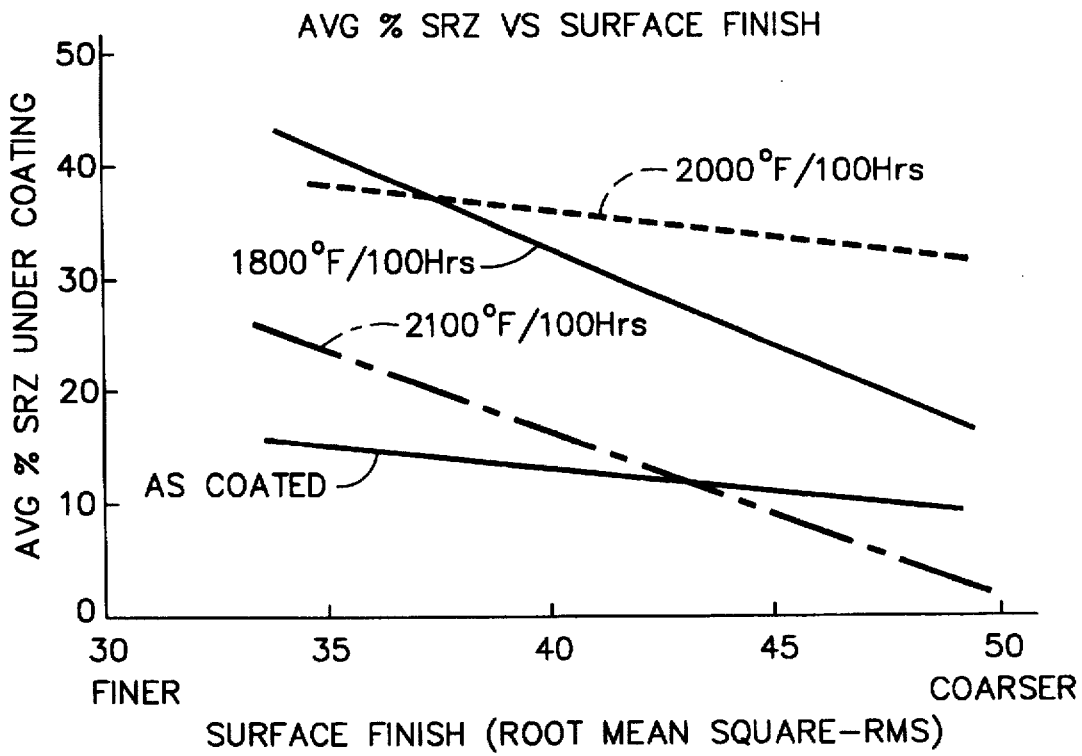
FIG. 1 is a graphical presentation of % SRZ under a coating as a function of surface finish.

During evaluation of the present invention, it was recognized that the mount of SRZ under a diffusion coating, such as an aluminide diffusion coating of a type generally applied commercially to gas turbine engine blades, varies with the degree of surface finish: the finer the finish the more SRZ under the coating. One commercial form of such an aluminide diffusion coating, sometimes called Codep Coating, is disclosed in U.S. Pat. No. 3,667,985—Levine et al, patented Jun. 6, 1972. In respect to the surface finish, a finer finish generally means that more surface stress has been introduced into the article surface portion. The graph of FIG. 1 summarizes results of this evaluation on specimens of an alloy identified as René N6 and described in the above incorporated Walston et al patent. These data show that surface stress is directly related to SRZ formation. Therefore, one form of the present invention is a method which neutralizes such surface portion stress after article processing which can produce such stress and prior to coating of the surface portion.

One method for neutralizing such stress in a surface portion is physically to remove that surface portion, prior to coating, by a means which does not introduce detrimental stress while it is practiced. Such substantially stress free material removal means can include surface electropolishing, electrochemical machining, low or stress free abrasion-type methods, as well as other substantially stress free material removal known in the metallurgical art.

Figure 2:
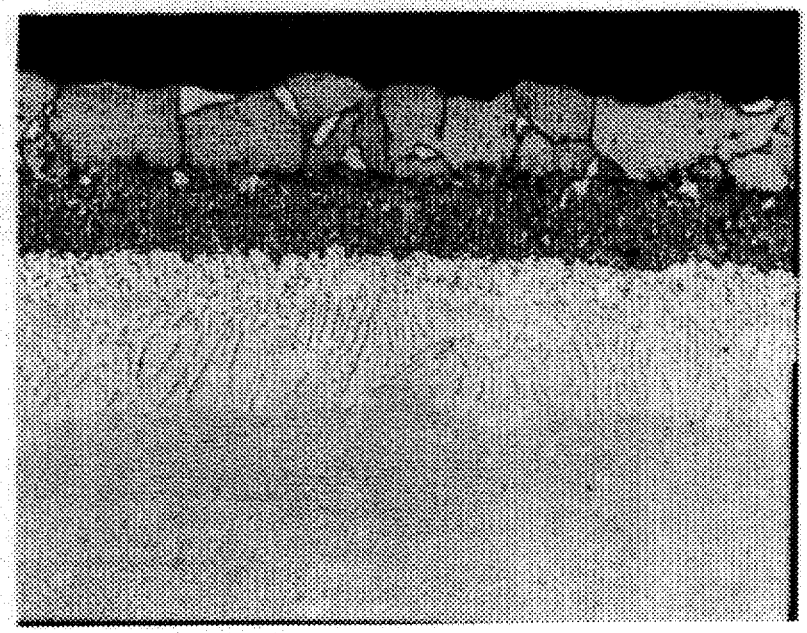
FIG. 2 is a photomicrograph at 500× of a Ni base superalloy aluminide coated after introduction of stress by grit blasting, showing extensive, continuous SRZ under the coating.
Figure 3:
FIG. 3 is a photomicrograph at 500× of the Ni base superalloy of FIG. 3 aluminide coated after grit blasting and then electropolishing to remove the stressed surface portion prior to coating, showing substantially no SRZ under the coating.

In tests associated with the present invention, specimens of an alloy identified as René 162 alloy, described in the above incorporated Austin et al patent and including Re in the range of about 5.7–7 wt. %, were aluminide coated with the above identified Codep aluminide diffusion coating after grit blasting, with and without physical removal of the surface portion stressed by grit blasting. The physical removal was accomplished by standard, commercial electropolishing. After coating, the coated alloy specimens representing both treatment conditions were exposed in air to a temperature of 2050° F. for 47 hours. FIGS. 2 and 3 compare the results of such testing.

FIG. 2 is a photomicrograph at 500× of that Ni base superalloy Codep aluminide diffusion coated after the grit blasting introduced a detrimental amount of stress into the surface portion. In that FIG. 2, an extensive, continuous SRZ formation is seen under the diffusion coating. By way of contrast, the FIG. 3 photomicrograph at 500× shows the condition under the coating after such grit blasting followed by removal of the stressed surface portion by electropolishing prior to coating. No detrimental SRZ is seen in FIG. 3 under the coating as a result of having neutralized the stress by physical removal of the stressed portion prior to coating.

Another form of the present invention relates to a particular kind of recrystallization to neutralize stress in a surface portion which is to be coated with a selected coating having a selected diffusion depth to which the coating is intended to progress. The diffusion depth generally results from the time and temperature selected for the coating as a function of mechanical properties desired to be maintained or developed. Generally there are two types of recrystallization typically observed in Ni base superalloys. One, sometimes called Type I recrystallization, occurs when a stressed specimen or article is exposed to temperatures approaching close to the gamma prime solvus of the alloy. The resulting microstructure generally consists of large recrystallized grains. Another, sometimes called Type II recrystallization, is referred to as cellular recrystallization and results from exposure at temperatures ranging from about 50° F. below to about 400° F. below the gamma prime solvus of the alloy. The cellular recrystallization consists of much finer grains or cells and is the type of recrystallization to which a form of this invention relates. This form of the invention for neutralizing stress in the surface portion by recrystallization, particularly of a single crystal structure, is to heat treat the surface portion in a manner which locally transforms the single crystal to a polycrystal by recrystallizing the stressed portion to a fine grained, cellular, Type II, structure extending into the surface portion to a depth substantially no greater than the selected diffusion depth. Then when the coating method is practiced, the diffusing coating consumes the fine, recrystallized grains within the diffusion depth, thereby maintaining the integrity of the original structure. The result is a coated surface portion from which has been eliminated the driving force for the formation of SRZ under or adjacent to the coating.

One early series of tests was designed and conducted to evaluate the effect of heat treatment after the introduction of cold work into a surface portion of a specimen and prior to diffusion coating, to minimize SRZ formation. Specimens used were a single crystal form of René N6 alloy, defined in the above incorporated Walston et al patent, nominally including Re at about 5.3 wt. %, and having a gamma prime solvus temperature of about 2380° F. Other specimens were of an alloy, sometimes called René N5, and nominally including about 3 wt. % Re. The specimens were processed initially to make all specimens uniform and comparable to standard production processing as a starting point. The specimens had experienced diffusion coating including standard production precoat heat treatment, grit blast at 55 psi, Pt electroplate without diffusion, diffusion aluminide, and post coating heat treatment. Such specimens then were acid stripped and again grit blasted at 55 psi to remove the diffusion zone of the standard production processing and to standardize the surface portions. This assured uniform cold work in a new surface portion in an amount greater than that normally introduced in standard processing and which was guaranteed to result in the formation of SRZ. Thereafter, the specimens were given three different treatments: no heat treatment, and two heat treatments intended to recrystallize the stressed surface portion to a fine grained, Type II structure, one being at 2050° F. for four hours and the other at 2100° F. for four hours. Each of these treatments were followed by the standard production coating method of first electroplating with Pt without a diffusion cycle, then a standard production aluminide and post coating heat treatment. The René N5 specimens, including about 3 wt % Re, in the range of about 1.5–4 wt. %, did not show the presence of SRZ. The amount of SRZ under the coating of each René N6 alloy specimen, including nominally about 5.3 wt. % Re, was measured by photomicrographic evaluation. The averages of the results are shown in the following Table I:

TABLE I

Average % SRZ Under Coating

| Test (in air) 100 hrs. | No Recrystallization | Recrystallization 2050° F./4 hrs. | Recrystallization 2100° F./4 hrs. |
|---|---|---|---|
| 1800° F. | 53 | 41 | 28 |
| 2000° F. | 75 | 60 | 25 |
| 2100° F. | 56 | 58 | 25 |

The data of Table I, representing an aggressive, severe condition not generated in production but produced for this evaluation, demonstrates that, according to a feature of the present invention, a properly selected stress relief heat treatment which causes local surface cellular type recrystallization is effective in minimizing even excessive SRZ in the surface portion under or adjacent to a standard production Pt-Al type diffusion coating. Such a method can reduce the need to control the inherent less severe surface work normally introduced during the making of an article, such as in its manufacture or repair, prior to final coating. In this evaluation, one preferred recrystallization heat treatment was at 2100° F. for 4 hours, about 280° F. below the gamma prime solvus temperature and representative of and within the range of about 50° F. below to about 400° F. below the gamma prime solvus temperature, of the René N6 alloy. This treatment which was intended to reduce surface portion stresses prior to coating, provided a small layer of cellular recrystallization no greater than about 1 mil in size, and neutralized the residual stresses due to cold work. This small cellular recrystallized structure, extending into the surface portion to a depth no greater than a diffusion depth to which the diffusion of the coating will extend, then was consumed, according to a form of this invention, during coating by the advancing, diffusing coating elements. The diffusion depth is established by selecting appropriate coating parameters which provides the article with desired mechanical properties. In this way, the tendency for SRZ formation is reduced or eliminated. For example, in this preliminary evaluation, at the 2000° F. test temperature for 100 hours in air, the heat treatment at 2100° F. for 4 hours reduced the SRZ formation from about 75% to about 25%, a significant, unexpected change. Therefore, under the conditions of the above evaluation, a heat treatment of about 2100° F. for about 4 hours to neutralize surface portion stresses can be selected for René N6 alloy prior to coating to minimize SRZ nucleation under such a coating. At the same time the heat treatment can be selected as an effective age for such a material to produce desired mechanical properties. Therefore, one form of the present invention to minimize the formation, or the tendency for the formation of SRZ, particularly under a diffusion coating, is to neutralize stresses in a surface portion of an article into which such coating is intended to be diffused. Such neutralization can be accomplished either by physically removing the surface portion which includes the potentially harmful stresses without introducing additional harmful stress, or by recrystallizing the stressed surface portion to a fine grained cellular structure which then can be consumed by the diffusion of elements of a subsequently applied coating.

Another form of the present invention to avoid SRZ formation under or adjacent to a coating elements of which diffuse into a surface portion, involves consideration of an alloy's Re content and the segregation of Re between dendrite cores and interdendritic regions, as was discussed above with the defined Re segregation factor, ReΔ. As was mentioned above, lower Re content alloys, such as René N5 alloy including Re up to about 4 wt. % and identified in the above incorporated Ross et al U.S. Pat. No. 5,173,255, generally are not seen to form SRZ because their Re content is no greater than about 4 wt. %. However, potential SRZ formation must be considered in connection with the making, such as manufacturing or repairing, of articles from Ni base superalloys including greater amounts of Re and which will include a surface portion coating. In the gas turbine art, such coatings frequently are of an aluminide type, often including other elements such as Pt, as identified above and widely reported in the art. According to a form of this invention, to avoid a detrimental formation of SRZ in such an alloy including greater than 4 wt. % Re under a coating, a heat treatment for the alloy, including solutioning temperature and time, is selected and conducted to result in a ReΔ of no greater than about 40%.

Another evaluation of the present invention included measuring the amount of SRZ under or adjacent to a diffusion coating as a function of solution heat treatment above the gamma prime solvus after different stress rupture tests. The specimens were single crystals of the above described René N6 alloy, including nominally about 5.3 wt. % Re and coated with the commercial Pt-Al aluminide type coating described above: first electroplated with Pt without a diffusion cycle and then diffusion aluminide coated over the electroplated Pt. The specimens were heat treated at about 2410° F., above the gamma prime solvus temperature of about 2380° F., for different periods of time to result in different ReΔ. A summary of test results showing a comparison of % SRZ under the diffusion coating with average of ReΔ generated under different gamma prime solutioning conditions is presented in the graph of FIG. 4.

Figure 4:
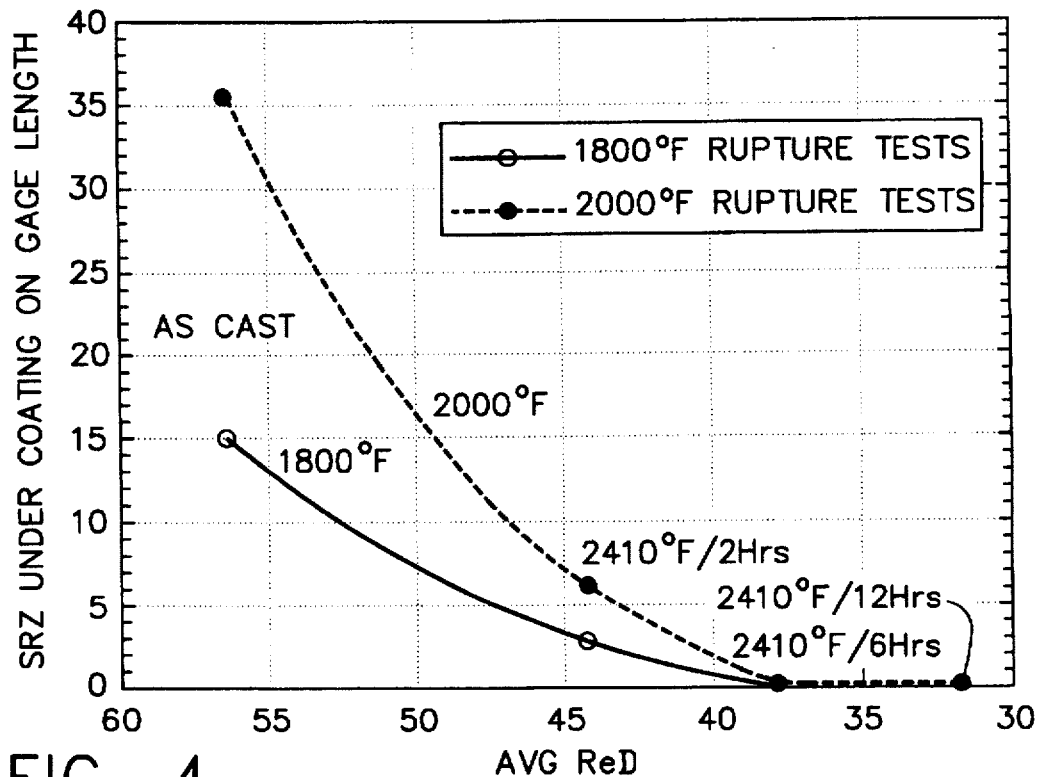
FIG. 4 is a graphical comparison of % SRZ under a diffusion coating with average % ReΔ generated under different gamma prime solutioning conditions.

From the data in the tests represented by FIG. 4, it was observed, unexpectedly, that solution heat treatment has a strong effect on the amount of SRZ under a coating on a Ni based superalloy including greater than about 4 wt. % Re. FIG. 4 shows that the as-cast specimens had the most SRZ, followed by the SRZ resulting from the heat treatment at 2410° F. for 2 hours. The 6 hour and the 12 hour heat treatments at 2410° F. resulted in very little, if any SRZ under the coating, at a ReΔ of no greater than about 40%. Any SRZ under the coating was not seen to affect stress rupture life. Therefore, according to one form of the present invention for avoiding detrimental amounts of SRZ under a coating elements of which can diffuse into a surface portion, the selection of a heat treatment above the gamma prime solvus temperature is made to result in a ReΔ of no greater than about 40%.

The present invention provides a method for making a coated article of improved microstructural stability from a Ni base superalloy by avoiding the formation of a detrimental amount of SRZ under or adjacent to a coating. The invention has been described in connection with specific examples, combinations and embodiments. However, it will be understood by those skilled in the arts involved that this invention is capable of a variety of modifications, variations and amplifications without departing from its scope as defined in the appended claims.

We claim:

1. In a method for making a coated article from a Ni base superalloy, to avoid, after elevated temperature exposure, formation of a Secondary Reaction Zone in an article surface portion under a coating at least partially diffused into the article surface portion by a selected coating method, the article, prior to coating having experienced processing which has developed stress in the article surface portion, the steps of:

neutralizing stress in the surface portion after exposure to the processing which has developed the stress in the surface portion and prior to the coating method; and then, coating the surface portion with the coating method.

2. The method of claim 1 wherein the neutralizing of stress in the surface portion is by physically removing the surface portion which includes the stress prior to coating and without introducing additional stress into the surface portion.

3. The method of claim 1 wherein:

the neutralizing of stress in the surface portion is by cellular recrystallization of the surface portion which includes the stress to generate a cellular structure of a cellular size substantially no greater than a size which can be consumed by advancing diffusion coating elements during the selected coating method; and then, coating the surface portion by the selected method in which diffusion of the coating elements substantially consumes the recrystallized cellular structure.

4. The method of claim 3, in which the coated article is a coated single crystal article, from a Ni base superalloy having a gamma prime solvus temperature and including greater than 4 wt. % Re, in which:

the cellular recrystallization is by heating the article surface portion which includes the stress in a combination of a recrystallization temperature range of from about 50° F. below to about 400° F. below the gamma prime solvus temperature of the superalloy and for a recrystallization time sufficient to recrystallize the surface potion which includes the stress to the cellular structure, with cells extending into the surface portion substantially no farther than a diffusion depth to which the diffusion coating elements will diffuse into the surface portion during the selected diffusion coating method, and of a cellular size substantially no greater than a size which can be consumed by the advancing diffusion coating elements during the selected coating method; and then, diffusion coating the surface portion by the selected diffusion coating method in which the diffusion coating elements substantially consume the recrystallized cells in the surface portion.

5. The method of claim 4 in which the diffusion coating includes Al.

6. The method of claim 5 in which the diffusion coating includes a combination of Al and Pt.

7. The method of claim 4 in which the recrystallized cells are no greater than about 1 mil in size.

* * * * *